United States Patent [19]
Smith

[11] 4,187,673
[45] Feb. 12, 1980

[54] FUEL CONTROL SYSTEM FOR A GAS TURBINE ENGINE

[75] Inventor: Trevor S. Smith, Sutton Coldfield, England

[73] Assignee: Lucas Industries Limited, Birmingham, England

[21] Appl. No.: 840,569

[22] Filed: Oct. 11, 1977

[30] Foreign Application Priority Data

Oct. 13, 1976 [GB] United Kingdom ............... 42485/76
Jan. 7, 1977 [GB] United Kingdom .................... 655/77

[51] Int. Cl.² ............................................. F02C 9/04
[52] U.S. Cl. ............................................. 60/39.28 R
[58] Field of Search ................................. 60/39.28 R

[56] References Cited

U.S. PATENT DOCUMENTS

| 2,857,741 | 10/1958 | Evers . | |
| 2,926,494 | 3/1960 | Farkas . | |
| 2,935,136 | 5/1960 | Wall et al. | 60/39.28 R |
| 2,941,601 | 6/1960 | Best | 60/39.28 R |
| 2,959,002 | 11/1960 | Best | 60/39.28 R |
| 3,012,401 | 12/1961 | Harner | 60/39.28 R |
| 3,084,510 | 4/1963 | Marscher | 60/39.28 R |
| 3,187,505 | 6/1965 | Plummer | 60/39.28 R |
| 3,196,613 | 7/1965 | Porter et al. | 60/39.28 R |

FOREIGN PATENT DOCUMENTS

858773 1/1961 United Kingdom .
958881 5/1964 United Kingdom .

Primary Examiner—Robert E. Garrett

[57] ABSTRACT

A fuel control system for a gas turbine engine has a main metering valve which is positioned by a servo pressure signal controlled by a pilot valve. The pilot valve is responsive to compressor pressures within the engine and also to the operating position of the main metering valve. Response to the main metering valve position is variable in accordance with the difference between desired and actual engine speeds, and is effected by varying the position of a force multiplying roller interposed between the main metering valve and the pilot valve.

18 Claims, 7 Drawing Figures

FUEL CONTROL SYSTEM FOR A GAS TURBINE ENGINE

This invention relates to a fuel control system for a gas turbine engine.

According to one embodiment of the invention a fuel control system for a gas turbine engine comprises a fuel metering valve which is responsive to a first servo pressure signal, a first pilot valve for regulating said first servo pressure signal, a control element which is movable in response to a second servo pressure signal, a second pilot valve for controlling said second servo pressure signal, means responsive to engine speed, for positioning said second pilot valve, selector means movable in response to changes in a desired speed of the engine, and means responsive to the position of said control element and to the position of said selector means for controlling said first pilot valve.

Embodiments of the invention will now be described by way of example only and with reference to the accompanying drawings in which.

Figure 1:
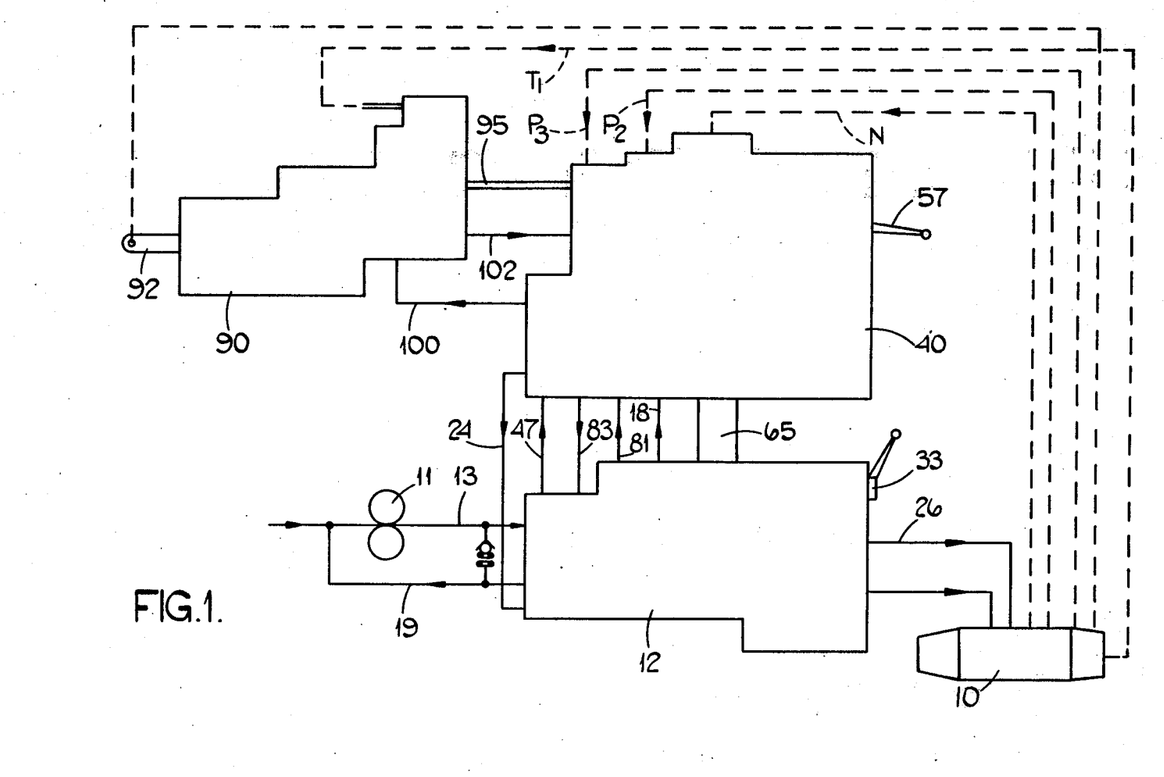
FIG. 1, shows a block diagram of one embodiment of a gas turbine engine fuel control system.
Figure 2:
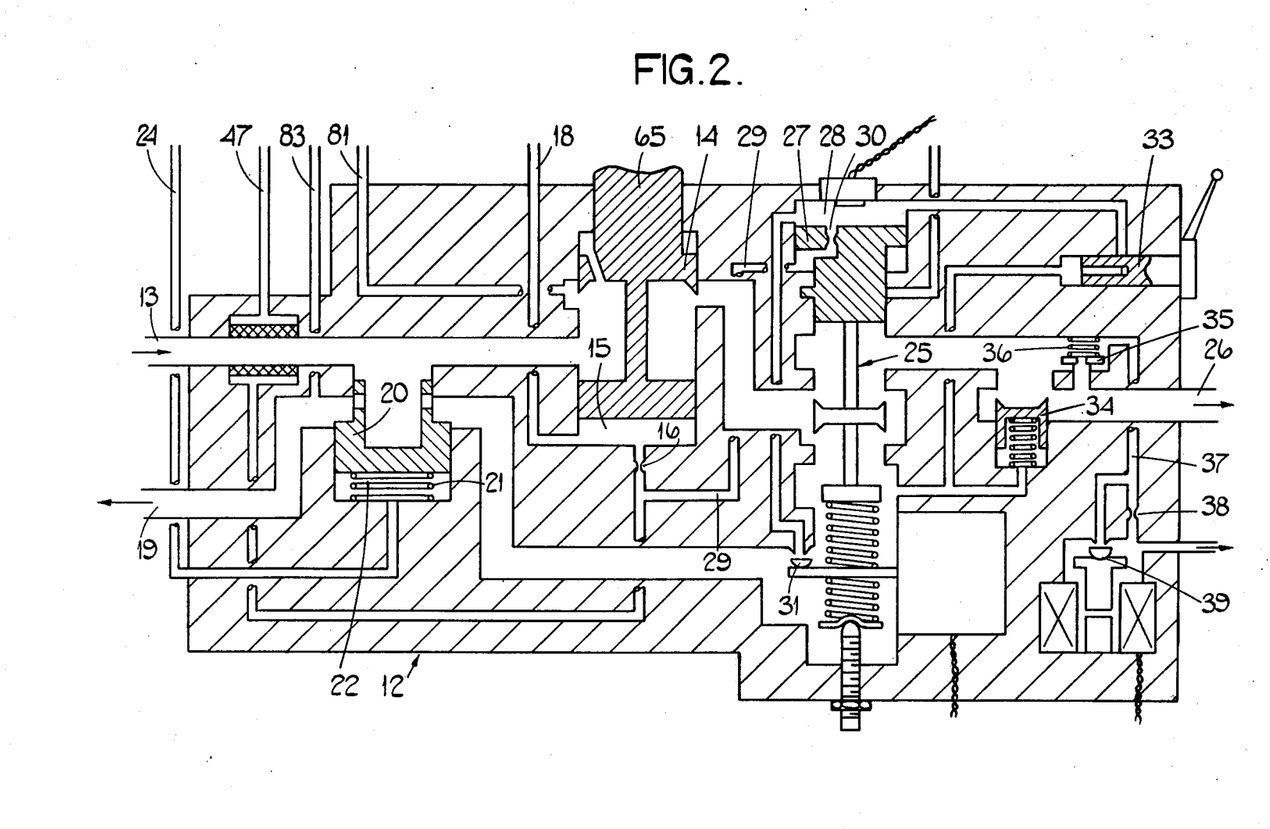
FIG. 2 shows a metering and throttle arrangement forming part of FIG. 1.

In the embodiment shown in FIGS. 1 to 4 a gas turbine engine 10 is supplied with fuel from a pump 11 via a metering and throttle arrangement 12 which is shown in more detail in FIG. 2. Fuel from the pump 11 is supplied via a passage 13 to a metering valve 14. Valve 14 is responsive to a first servo pressure in a chamber 15. Chamber 15 communicates with the passage 13 by means of a restrictor 16 and with a first pilot valve 17, later to be described by means of a passage 18.

A low pressure return line 19 communicates with the up-stream side of pump 11, and a spill valve 20 allows fuel to be spilt from passage 13 to the return line 19. Spill valve 20 is urged open by the pressure in passage 13 and is urged shut by a spring 21 and by the pressure in a chamber 22 which communicates with a valve 23, later to be described in detail, via a line 24.

A combined throttle and spill valve 25 is arranged in series between the metering valve 14 and an outlet passage 26 through which fuel can flow to the engine 10. The valve 25 is movable by a piston 27 which is responsive to the pressure in a chamber 28, this pressure being derived from that in passage 13 by means of a line 29, a restrictor 30 and a control valve 31. Valve 31 is operated by a torque motor 32 which is responsive to the values of engine speed and combustion chamber temperature, an unacceptable rise in these values causing valve 31 to be opened so that the valve 25 moves to restrict fuel flow to the outlet passage 26 and to increase spill flow to the low pressure return line 19. A manually-operable valve 33 permits the pressure in chamber 28 to be reduced to that in the low pressure return line 19, whereby the valve 25 completely shuts off fuel flow to the outlet passage 26.

In series between the valve 25 and the outlet passage 26 is a spring-loaded pressurising valve 34. In parallel with the valve 34 is a restrictor plate 35 through which, at engine light up, fuel can flow to the outlet passage 26 when the pressurising valve 34 is closed. The restrictor plate 35 is biased by a spring 36 into engagement with a seat and can be lifted away from this seat to allow return flow of fuel, so that the outlet passage 26 may be purged of fuel when the engine is shut down. A passage 37 communicates with the outlet of the valve 25 and also with the igniters of the engine 10 via a restrictor 38. A solenoid valve 39 is arranged in parallel with the restrictor 38 and is operable, at engine light-up, to supply fuel to the igniters.

Figure 3:
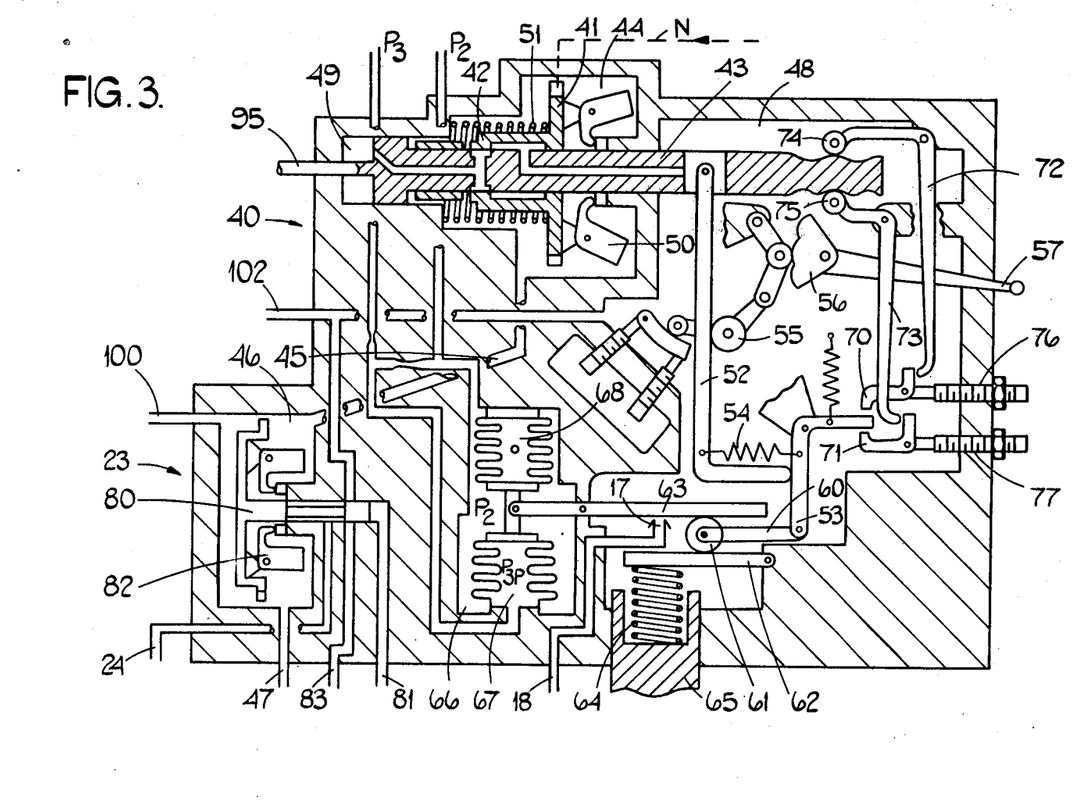
FIG. 3 shows a servo pressure signal generating arrangement forming part of FIG. 1.

The servo pressure for controlling the metering valve 14 and spill valve 20 are obtained from a servo pressure signal generating arrangement 40, shown in detail in FIG. 3. A governor arrangement 41 is driven at the speed N of the engine 10 and includes a ported sleeve 42 slidable on a piston control element 43. Governor arrangement 41 is mounted within a chamber 44 which communicates with the outlet of pump 11 via a line 45, a further chamber 46, and a line 47. Sleeve 42 acts as a second pilot valve to derive a second servo pressure from the pressure intermediate that in chamber 44 and a low return pressure in a chamber 48. The second servo pressure is applied to a chamber 49 to act on the piston control element 43. The arrangement is such that movement of the sleeve 42 to increase the second servo pressure in chamber 49 urges the control element 43 in a direction to reduce the second servo pressure. The sleeve 42 and control element 43 thus act in a well-known manner to provide a follow-up servo control arrangement.

In a preferred embodiment the profiles of the gover­nor weights 50 are such that the sleeve 42 is urged against a spring 51 by a distance which is proportional to the speed N of the engine, and the control element 43 thus, itself, is positioned in accordance with the speed N of the engine.

Pivotally mounted on the piston control element 43 is a lever 52 which is urged into engagement with a bell-crank 53 by a spring 54. Lever 52 also pivots about a roller 55 which is positioned by a cam 56 movable by a lever 57 in accordance with a desired speed $\theta$ of the engine 10. The profile of the cam 56 is such that displacement of the roller 55 is directly proportional to the desired speed $\theta$.

Pivotally attached to one end of the bell-crank 53 is an arm 60 at the free end of which is a roller 61. Roller 61 is engaged between a lever 62 and a further lever 63 which provides a control element for the first pilot valve 17. A spring 64 is engaged between the lever 62 and a piston portion 65 of the control element of the fuel metering valve 14 to provide a position feedback signal from metering valve 14. Lever 63 extends sealingly into a chamber 66 and is acted upon by two bellows units 67, 68 within the chamber 66. Bellows unit 68 is evacuated and bellows unit 67 is responsive to a pressure P3 P derived from the delivery pressure P3 of the engine compressor. Chamber 66 contains a pressure P2 from an intermediate stage of the engine compressor. The lever control element 63 of the first pilot valve 17 is thus positioned in accordance with engine compressor pressures P3 and P2, and the position feedback signal provided by the spring 64 is modified in accordance with the difference between actual engine speed N and desired engine speed θ, by the roller 61.

Movement of roller 61 in response to differences between the desired and actual engine speeds is limited by stops 70, 71 which are engageable by an end of the bell-crank 52 remote from that engaged by the arm 60. Stops 70,71 are themselves pivotally mounted and can engage one end of respective bell-cranks 72, 73. The other ends of bell-cranks 72, 73 carry rollers 74, 75 which engage respective cam profiles on the piston control element 43. Stop 70 is a deceleration stop and stop 71 is an acceleration stop, and the responses of stops 70, 71 to the cam profiles of control element 43 are themselves adjustable by means of respective threaded stems 76, 77.

The valve 23, previously referred to comprises a spool control element 80 urged in a first direction by the pump delivery pressure in line 47 and in the opposite direction by the pressure in a line 81 which communicates with the outlet of the fuel metering valve 14. Spool control element 80 is thus responsive to the pressure difference across the valve 14, and is also urged against the pressure in line 81 by a governor arrangement 82 in response to an increase in engine speed N. Valve 23 applies to the chamber 22 of the spill valve 20, via the line 24 a pressure signal which is dependent on engine speed and on the pressure drop across fuel metering valve 24. This latter pressure signal is derived from the pump delivery pressure in chamber 46 and the pressure in a line 83 which communicates with the low pressure return line 19. The arrangement is such that for a given engine speed the pressure drop across the fuel metering valve 14 is maintained substantially constant.

Figure 4:
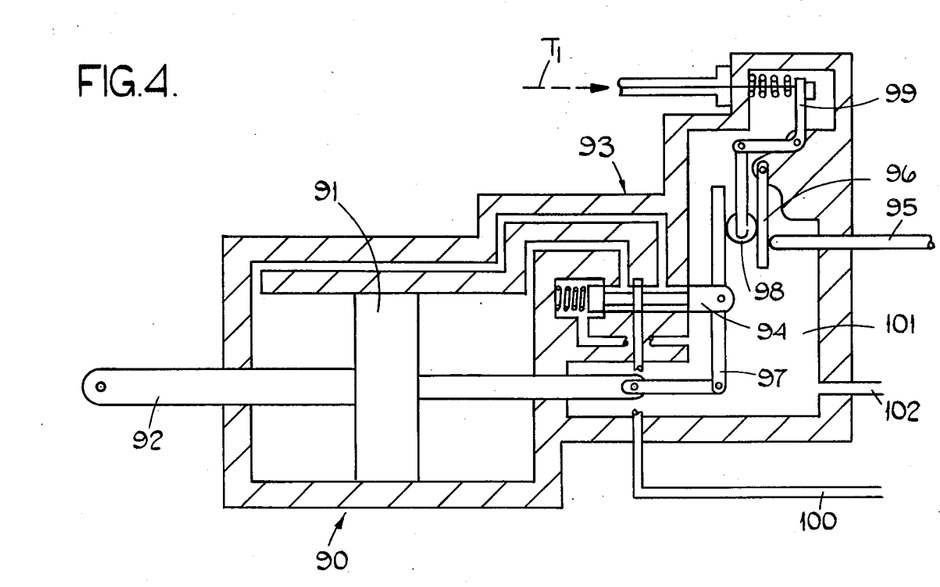
FIG. 4 shows an actuator arrangement forming part of FIG. 1.

An actuator arrangement 90 is shown in detail in FIG. 4 and comprises a double-acting piston 91 whose output rod 92 is connected to the stator vanes of the engine compressor. Pressure may be applied to opposite sides of the piston 91 by means of a third pilot valve 93 which has a spool control element 94 movable by a stem 95 which is integral with the piston control element 43. Stem 95 coacts with spool 94 by means of levers 96, 97. Lever 97 pivotally engages both the spool 94 and the rod of piston 91. A roller 98 is engaged between levers 96, 97 and can be positioned via a bell-crank 99 in accordance with the intake temperature T1 of the engine 10. The response of spool 94 to movements of the stem 95 is thus responsive to engine intake temperature T1. Spool 94 is operable to apply pump delivery pressure to a selected side of the piston 91, this pressure being obtained via line 47, passage 46 and a line 100. The other side of piston 91 is exposed to the pressure in a chamber 101 which communicates with the low pressure return line 19 via a line 102 and line 83. Connection of the lever 97 to the piston 91 and the spool 94 has the effect that movement of the piston 91 urges spool 94 in a direction opposite to that originally causing the piston movement.

In use, the metering valve 14 is positioned by means of the bellows 67, 68 and the pilot valve 17, in accordance with the compressor pressures P2 and P3. The feed-back from the fuel valve 14 to the pilot valve 17 is dependent on the position of roller 61, which acts as a multiplying element between the levers 62, 63. The response of the fuel valve 14 to compressor pressures P2 P3 is thus trimmed in accordance with the difference between actual engine speed N and desired engine speed θ. The positions of the engine compressor stator vanes are adjusted, by the actuator arrangement 90, in accordance with engine speed and inlet temperature.

Figure 5:
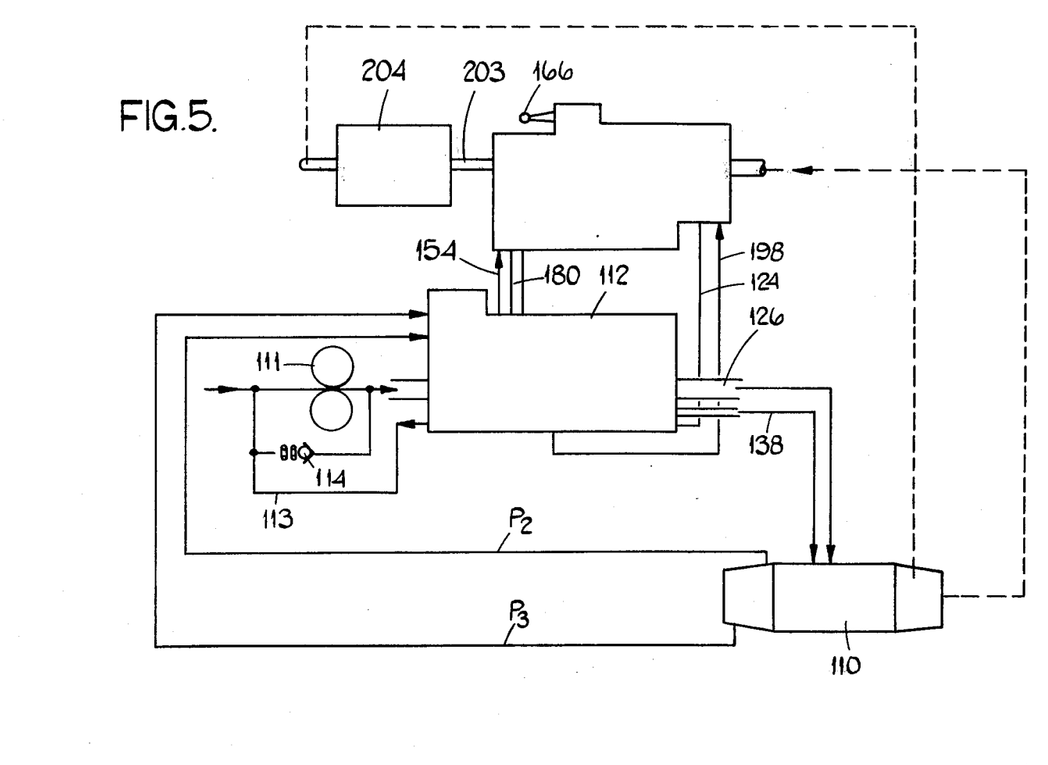
FIG. 5 is a block diagram of an alternative embodiment of a system according to the invention.
Figure 6:
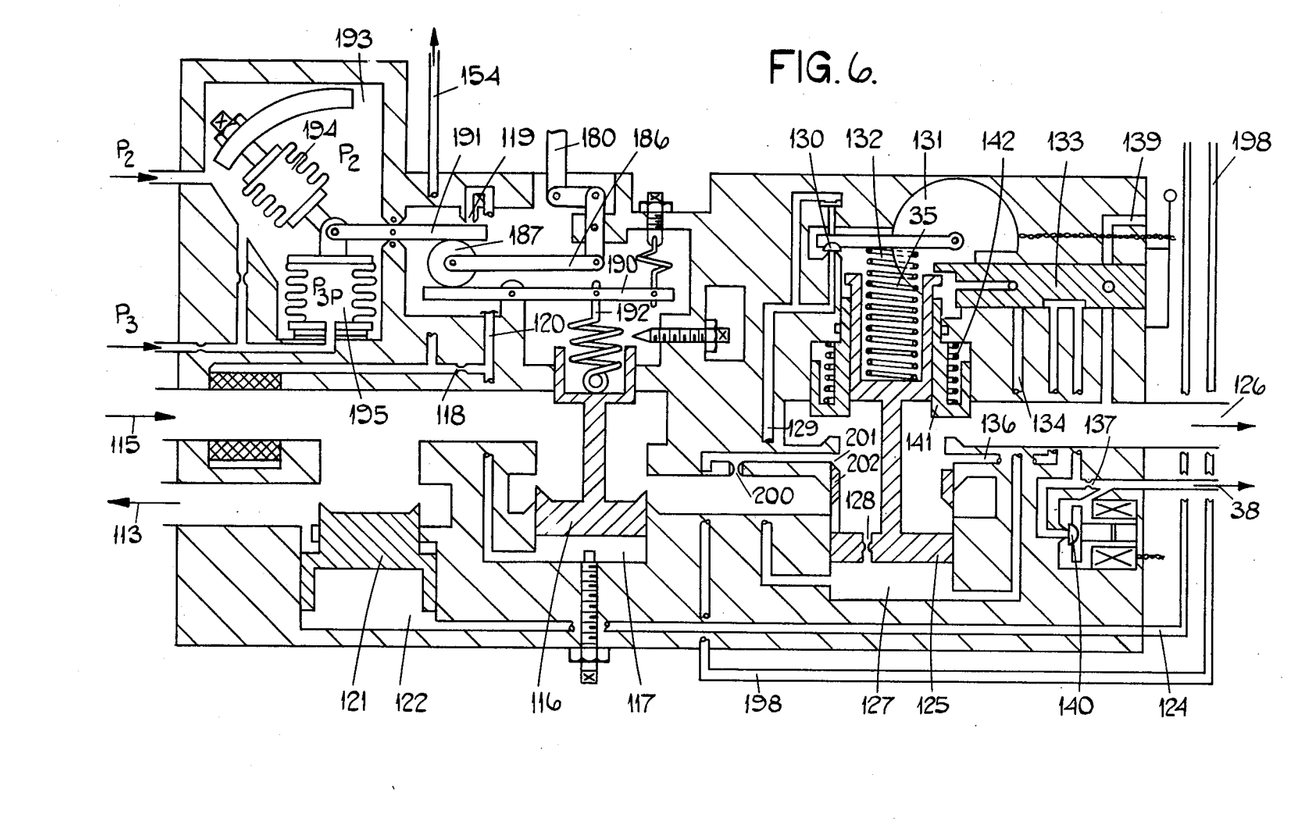
FIG. 6 shows a metering and throttle arrangement forming part of FIG. 5.
Figure 7:
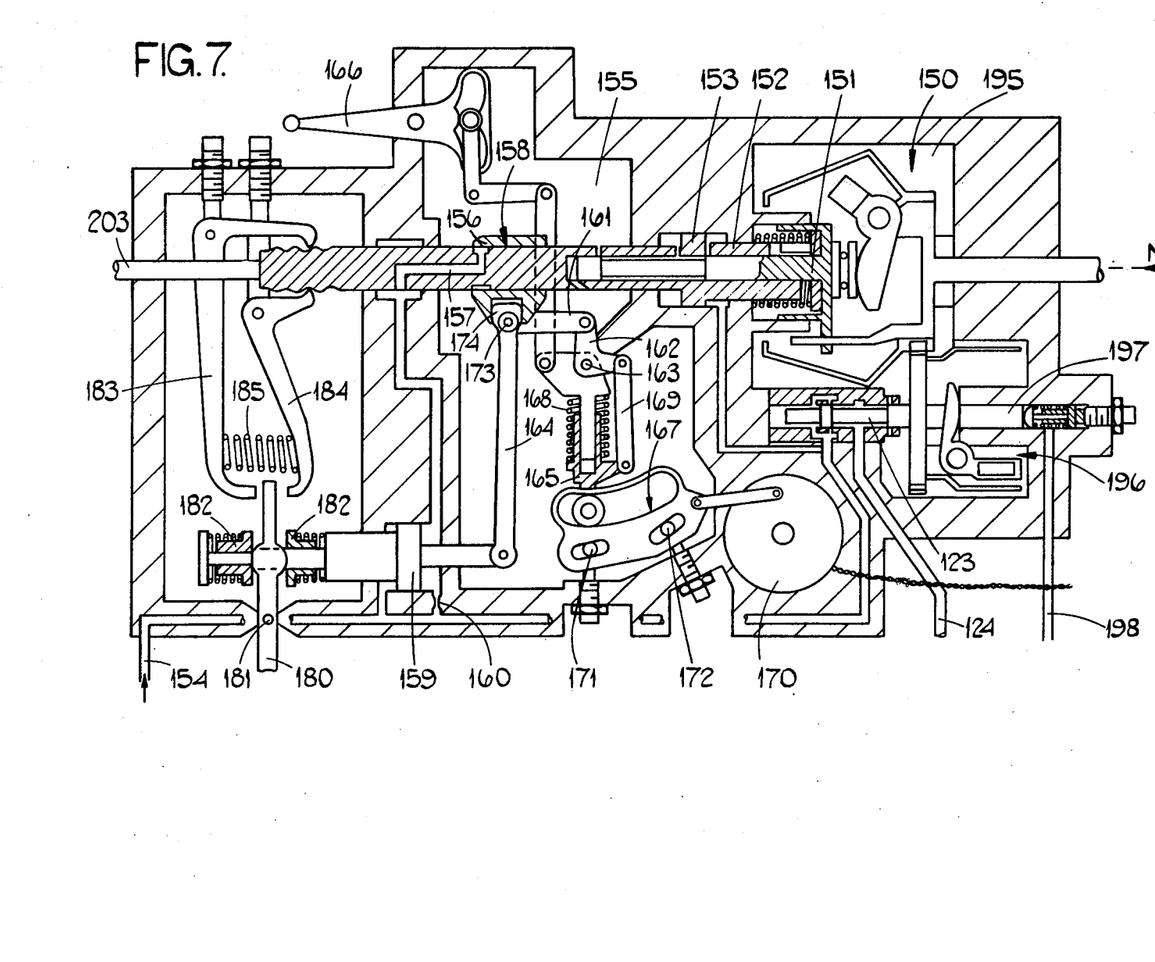
FIG. 7 shows a speed control arrangement forming part of FIG. 5.

The embodiment shown in FIGS. 5 to 7 is similar in principle to that shown in FIGS. 1 to 4, but includes an arrangement whereby the roller, which modifies the feed-back force from the main metering valve to its pilot valve is positioned by a servo pressure signal, instead of directly by means of a mechanical linkage. The response of the arrangement to variations in demanded speed is also variable by an electrical trimming device.

In the embodiment shown in FIGS. 5 to 7 a gas turbine engine 110 is supplied with fuel from a pump 111 via a metering and throttle valve arrangement 112 which is shown in more detail in FIG. 6. The outlet of the pump 111 communicates with a low pressure return line 113 by way of a non-return valve 114. Fuel from the pump 111 is supplied via a passage 115 to a metering valve 116. Valve 116 is responsive to a first servo pressure in a chamber 117. Chamber 117 communicates with the passage 113 by means of a restrictor 118 and also with a first pilot valve 119, later to be described, by means of a passage 120.

A spill valve 121 allows fuel to be spilt from the passage 115 to the return line 113. The spill valve 121 is urged open by the pressure in passage 115 and is urged shut by a servo pressure in a chamber 122. A valve 123, later to be described supplies this servo pressure, by means of a line 124.

A throttle valve 125 is arranged in series between the metering valve 116 and an outlet passage 126 through which fuel can flow to the main burners of the engine 110. The throttle valve 125 includes a piston portion which is responsive to the pressure in a chamber 127, this pressure being derived from that in the outlet passage 126 by means of a restrictor 128, a line 129 and a control valve 130 is operated by a torque motor 131 which is responsive to the values of engine speed and combustion chamber temperature, an unacceptable rise in these values causing valve 130 to be opened so that the throttle valve 125 moves downwardly, as shown in FIG. 6 to restrict fuel flow to the outlet passage 126. Valve 130 opens into a chamber 132 which communicates with the low pressure return line 113. A manually-operable valve 133 permits chamber 127 to communicate, via a line 134, with the chamber 132, and thereby to move the throttle valve 125 so as completely to shut off fuel flow to the outlet passage 126. A feed-back spring 135 co-acts with the throttle valve 125 and the control valve 130, so that movement of the valve 125 causes a change in the servo pressure in chamber 127 which opposes that movement.

In the normal operating condition (shown) of the manually operable valve 133 the outlet passage 126 communicates, via a line 136, the valve 133, a restrictor 137 and a passage 138 with the igniter burners of the engine 110.

In the shut down condition of valve 133 the chamber 127 is connected, as previously described, to low pressure fuel flow to the igniters is shut off and the outlet passage 126 communicates with a dump connection 139. A solenoid valve 140 is operable at engine start up to by-pass the restrictor 137 and to supply the proper quantity of ignition fuel to the engine 110.

A sleeve 141 surrounding the throttle valve 125 is responsive to the fuel pressure immediately downstream of the controlled orifice of the throttle valve, and is biased by a spring 142 against this downstream pressure, to provide a pressurising valve when the throttle valve 125 is open.

As shown in the speed control arrangement of FIG. 7 a governor arrangement 150 is driven at the speed N of the engine 110 and includes a valve spool 151 slidable within a ported stem 152 which forms part of a piston 153. The spool 151 and stem 152 co-operate to define a valve which is in series with a line 154 between the outlet of the pump 111 and a low pressure chamber 155. One side of the piston 153 is subjected to the pressure in line 154 and the other side of the piston 153 is subjected to a pressure intermediate the pressure in line 154 and the pressure in the chamber 155. The valve spool 151 and piston 153 thus provide a follow-up servo arrangement, to position the piston 153 in accordance with the speed N of the engine 110. The profiles of the weights of the governor 150 may be such that the piston 153 adopts a position directly proportional to the speed N of the engine, as previously described with reference to FIG. 3.

Surrounding the stem 152 of the piston 153 is a collar 156 which co-operates with a passage 157 within the stem 152 to define a control valve 158 for a servo piston 159. Valve 158 is in series with a resistor 160 between the line 154 and the low pressure chamber 155.

The collar 156 is positioned in accordance with a desired speed of the engine, by means of a link 161 one end of which pivotally engages a crank 162 which is mounted on a fixed pivot 163. The other end of the link 161 engages an arm 164 by means of a pivot pin 173. One end of the arm 164 moves with the piston 159 and the other end 174 of the arm 164 is in the form of a cam which is engaged in a fork in the collar 156. The cam end 174 of arm 164 is such that clockwise movement of arm 164 about the pin 173 urges the collar 156 to the right and anticlockwise movement of arm 164 urges the collar 156 to the left. A cam follower 165 is movable about the fixed pivot 163 by means of a pilot's speed selection lever 166. The cam follower 165 is biased into engagement with a cam surface 167 by a spring 168, and movement of the cam follower 165 are transmitted to the collar 156 by a further link 169, the crank 162 and the link 161. The stem 152 is positioned in accordance with engine speed N and the collar 156 is positioned, inter alia in accordance with desired engine speed. The arm 164 provides a feed-back line which is responsive to movement of the piston 159 to move the collar 156 in a direction which varies the servo pressure in passage 157 in a sense to oppose movement of the piston 159. The piston 159 is thus positioned in accordance with the difference between desired and actual engine speed. The position of the cam surface 167 relative to the pivot 163 is adjustable by an electric motor 170 which can slide the cam surface 167 on adjustable supports 171, 172. A lever 180 is movable by the piston 159 about a fixed pivot 181. Movement of the piston 159 is transmitted to lever 180 by spring-biased bushes 182. Movement of the lever 180 in response to differences between the desired and actual engine speeds is limited by bell cranks 183, 184 which are biased into engagement with respective cam profiles on the stem 152 by a spring 185. The bushes 182 allow for over travel of the piston 159 after engagement of the lever 180 with either of the cranks 183, 184. The crank 183 acts as an acceleration stop and the crank 184 acts as a deceleration stop.

Referring back to FIG. 6 the lever 180 coacts with an arm 186 at the free end of which is a roller 187. The roller 187 is engaged between a lever 190 and a further lever 191 which provides a control element for the pilot valve 119. A spring 192 is engaged between the lever 190 and the control valve 116 to provide a position feed-back signal from the valve 116. The lever 191 extends sealingly into a chamber 193 and is acted upon by two bellows units 194, 195. Bellows unit 194 is evacuated and bellows unit 195 is responsive to a pressure P3 P derived from the delivery pressure P3 of the engine compressor. Chamber 193 contains a pressure P2 from an intermediate stage of the engine compressor. The lever control element 191 of the pilot valve 119 is thus positioned in accordance with engine compressor pressures P3 and P2 and the position feed-back signal provided by the spring 192 is modified in accordance with the difference between actual engine speed N and the desired engine speed, by the roller 187.

Returning to FIG. 7 the servo pressure in the line 124 for positioning the spill valve 121, is as indicated above, controlled by the valve 123. Valve 123 is a spool valve which is connected between the line 154 and a low pressure chamber 195. The spool of valve 123 is positioned by a governor arrangement 196 which is driven by the governor arrangement 150. An increase in the engine speed N causes the spool of valve 123 to move in a direction to increase the pressure in line 124, and thereby to decrease spill flow. The governor arrangement 196 abuts a piston 197 which is responsive to the pressure in a line 198, an increase in the pressure in line 198 also acting to increase the pressure in line 124.

Line 198 communicates with the outlet of the metering valve 116 via a restrictor 200 and also with the outlet passage 126 via a port 201 which can be closed off by a part 202 of the throttle valve 125 when the latter is in its fully open position. Thus with the throttle valve wide open and the port 201 shut the pressure in line 198 is that at the outlet of the metering valve 116. In this condition the pressure in the line 124 is, for a given engine speed N, dependent on the pressure at the outlet of the metering valve 116, and the spill valve 121 is thus positioned in accordance with the pressure drop across the metering valve 116. In all other conditions of the throttle valve 125 the port 201 is at least partly open, whereby the pressure in line 198 is dependent on the pressure in the outlet passage 126. In these circumstances the spill valve 121 is responsive to the pressure drop across the series arrangement of the metering valve 116 and the throttle valve 125.

The throttle valve 125 is dimensioned so that, in its wide open condition, it imposes very little restriction in fuel flow to the engine, this flow being regulated almost entirely by the metering valve 116. Control valve 130 is opened by the torque motor 131 to reduce pressure in chamber 127 and thereby to move the throttle valve in a shutting direction, only in response to an unacceptable rise in either engine speed or combustion chamber temperature. In normal operation, therefore, the spill valve 121 remains responsive to the pressure drop across the metering valve 116 only. If the throttle valve 125 moves in a closing direction the resultant decrease in pressure in the line 198 moves the spool of valve 123 to the right, reducing the pressure in line 124 to permit increased spill flow.

A stem 203 extends from the piston 153 and controls an actuator arrangement 204 which corresponds to the actuator arrangement 90, previously described in connection with FIG. 4, and which positions the engine compressor stator vanes.

I claim:

1. A fuel control system for a gas turbine engine, comprising a fuel metering valve which is responsive to a first servo pressure signal, a first pilot valve for regulating said first servo pressure signal, a control element which is movable in response to a second servo pressure signal, a second pilot valve for controlling said second servo pressure signal, means responsive to engine speed, for positioning said second pilot valve, selector means movable in response to changes in a desired speed of the engine, a member slidable relative to said control element and co-operating therewith to define a pressure-regulating valve, an actuator for controlling said first pilot valve, said actuator being responsive to the pressure controlled by said pressure regulating valve, and means for positioning said member relative to said control element in accordance with the position of said actuator.

2. A system as claimed in claim 1 which includes feed-back means for applying a force to said first pilot valve dependent on the operating position of said fuel metering valve, said means for controlling the first pilot valve including means for varying the force applied by said feedback means.

3. A system as claimed in claim 2 in which said feedback means comprises a first lever resiliently coupled to said fuel metering valve, said first pilot valve comprises a second lever movable to regulate said first servo pressure signal and said force varying means comprises a transmission member engaging said first and second levers and movable to vary its point of engagement with one of said levers.

4. A system as claimed in claim 3 in which said transmission member is movable to vary its point of engagement with both of said levers.

5. A system as claimed in claim 3 in which said transmission member is a roller.

6. A system as claimed in claim 3 which includes means, responsive to the position of said control element, for limiting movement of said transmission member.

7. A system as claimed in claim 1 which includes means, responsive to changes in a pressure at the engine compressor for operating said first pilot valve.

8. A system as claimed in claim 1 in which said means responsive to engine speed includes means for causing the position of said second pilot valve and the position of said control element to be directly porportional to engine speed.

9. A system as claimed in claim 1 in which said control element comprises a piston, and said second pilot valve comprises an element slidably engaging said piston and co-operating with ports therein to regulate said second servo pressure signal.

10. A system as claimed in claim 1 which includes a spill valve responsive to a third servo pressure signal for spilling fuel from the inlet of said fuel metering valve, and a third pilot valve for generating said third servo pressure signal in response to a pressure difference between the inlet and outlet of said metering valve.

11. A system as claimed in claim 10 which includes a throttle valve in series with said fuel metering valve, and means, responsive to operation of said throttle valve, for causing said spill valve to be responsive to the pressure difference across said metering valve alone when the throttle valve is fully open, and to the pressure difference across the series arrangement of said metering valve and said throttle valve in all other states of said throttle valve.

12. A system as claimed in claim 11 in which said third pilot valve is responsive to the pressure at the inlet of said fuel metering valve and to a signal pressure dependent on the pressure at the outlet of said fuel metering valve, these being a flow restrictor and a control port connected in series between the outlets of said fuel metering valve and said throttle valve, said signal pressure being that intermediate said restrictor and said port, said means responsive to operation of said throttle valve comprising a part of said throttle valve operable to shut said port when the throttle valve is fully open.

13. A system as claimed in claim 11 which includes a fourth pilot valve, responsive to an unacceptable rise in an operating condition of the engine, for controlling a fourth servo pressure signal, said throttle valve being responsive to said fourth servo pressure signal.

14. A system as claimed in claim 1 in which said means for controlling the first pilot valve is resiliently coupled to said control element.

15. A system as claimed in claim 1 which includes a resilient coupling between said actuator and said first pilot valve.

16. A system as claimed in claim 1 which includes means for positioning said memer in response to movement of said selector means.

17. A system as claimed in claim 16 which includes means for varying the response of said member to movement of said selector means.

18. A system as claimed in claim 17 in which said response varying means comprises cam means coacting with said member and said selector means for varying the relative positions thereof over their ranges of movement and means for adjusting the position of said cam means.

* * * * *